United States Patent
Murai et al.

(10) Patent No.: US 9,016,882 B2
(45) Date of Patent: Apr. 28, 2015

(54) STROBE DEVICE

(75) Inventors: Toshiaki Murai, Osaka (JP); Yoshihiro Kanbata, Niigata (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/009,131

(22) PCT Filed: Apr. 2, 2012

(86) PCT No.: PCT/JP2012/002281
§ 371 (c)(1),
(2), (4) Date: Oct. 1, 2013

(87) PCT Pub. No.: WO2012/137467
PCT Pub. Date: Oct. 11, 2012

(65) Prior Publication Data
US 2014/0233207 A1    Aug. 21, 2014

(30) Foreign Application Priority Data
Apr. 6, 2011  (JP) .................................. 2011-084283

(51) Int. Cl.
*G03B 15/02*    (2006.01)
*G03B 15/05*    (2006.01)
*H01J 61/54*    (2006.01)
(Continued)

(52) U.S. Cl.
CPC ........ *G03B 15/05* (2013.01); *G03B 2215/0578* (2013.01); *G03B 2215/0582* (2013.01); *H01J 61/547* (2013.01); *H01J 61/025* (2013.01); *H01J 61/90* (2013.01)

(58) Field of Classification Search
USPC ............................................................ 362/16
See application file for complete search history.

(56) References Cited

U.S. PATENT DOCUMENTS

| | | |
|---|---|---|
| 3,484,597 A | 12/1969 | Schmidt |
| 4,404,618 A | 9/1983 | Yamada et al. |
| 5,651,601 A * | 7/1997 | Morisawa ....................... 362/16 |

(Continued)

FOREIGN PATENT DOCUMENTS

| | | |
|---|---|---|
| JP | 62-142152 U | 9/1987 |
| JP | 08-240840 A | 9/1996 |
| JP | 2006-216360 A | 8/2006 |

OTHER PUBLICATIONS

International Search Report for Application No. PCT/JP2012/002281, dated May 1, 2012.

(Continued)

*Primary Examiner* — Mary Ellen Bowman
(74) *Attorney, Agent, or Firm* — RatnerPrestia

(57) ABSTRACT

A strobe device of the present invention includes a flash discharge tube having an anode electrode and a cathode electrode on both ends thereof, and a conductive reflector in contact with an outer peripheral surface of the flash discharge tube. The reflector houses a part of the flash discharge tube inside, and functions as an external trigger electrode. The reflector has a bottom that is in contact with a portion of the outer peripheral surface of the flash discharge tube, the portion covering at least an area between the anode electrode and the cathode electrode and a sintered metal of the cathode electrode. This can suppress variation in discharge path at every light emission from the flash discharge tube. As a result, variation in light quantity and variation in light distribution of light emitted from the strobe device can be suppressed.

2 Claims, 6 Drawing Sheets

(51) Int. Cl.
*H01J 61/02* (2006.01)
*H01J 61/90* (2006.01)

(56) References Cited

U.S. PATENT DOCUMENTS 6,445,885 B2 * 9/2002 Nakanishi et al. ............ 396/176
2002/0080614 A1 6/2002 Terada 2004/0114917 A1 * 6/2004 Saiki et al. .................... 396/155
2010/0061075 A1 3/2010 Huang et al.
2013/0215592 A1 * 8/2013 Yoneya et al. ................. 362/16

OTHER PUBLICATIONS

The Extended European Search Report dated Sep. 9, 2014 for the related European Patent Application No. 12767461.2.

* cited by examiner

| Number of light emissions | No.1 | No.2 | No.3 |
|---|---|---|---|
| 1 | -0.5% | -0.8% | -0.3% |
| 2 | -0.9% | 1.4% | -2.0% |
| 3 | -0.4% | -1.7% | 0.3% |
| 4 | -0.9% | -0.2% | 1.4% |
| 5 | -1.5% | 1.3% | 1.0% |
| 6 | 1.9% | -0.1% | 0.9% |
| 7 | 1.0% | 1.6% | 0.1% |
| 8 | -0.9% | -1.1% | 0.5% |
| 9 | 0.7% | -1.0% | -1.1% |
| 10 | 1.5% | 0.5% | -0.9% |
| σ | 1.2% | 1.2% | 1.1% |

| Number of light emissions | No.4 | No.5 | No.6 |
|---|---|---|---|
| 1 | 0.8% | 0.1% | -0.5% |
| 2 | -2.1% | -4.1% | 1.0% |
| 3 | -5.0% | 3.5% | -2.2% |
| 4 | -0.1% | 0.9% | 0.7% |
| 5 | 3.5% | 3.9% | 2.7% |
| 6 | 2.6% | 8.3% | 1.4% |
| 7 | 1.5% | 0.4% | -2.8% |
| 8 | -0.7% | -0.7% | 3.2% |
| 9 | -0.3% | -5.8% | -0.6% |
| 10 | -0.1% | -6.0% | -2.8% |
| σ | 2.4% | 4.5% | 2.2% |

STROBE DEVICE

This Application is a U.S. National Phase Application of PCT International Application PCT/JP2012/002281.

TECHNICAL FIELD

The present invention relates to strobe devices used typically for photography, and more particularly to strobe devices employing a reflector for distributing light from a flash discharge tube to a photographic subject.

BACKGROUND ART

Conventionally, this type of strobe device includes a flash discharge tube for emitting light, and a reflector for reflecting the light emitted from the flash discharge tube toward a photographic subject.

Normally, a thin conductive film configuring an external trigger electrode is provided on the flash discharge tube around its outer peripheral surface, in order to facilitate lighting.

By applying trigger voltage from, for example, an external circuit to this thin conductive film, which is the external trigger electrode, a discharge path is formed inside the flash discharge tube and the light is emitted from the flash discharge tube.

However, in the strobe device as configured above, there is a disadvantage that the thin conductive film absorbs the light emitted from the flash discharge tube. In addition, since the discharge path is not stable, due to a large movement (fluctuation) of discharge path at every emission of light inside the flash discharge tube, an amount of light emitted from the flash discharge tube varies or light distribution varies.

To solve the above disadvantages, the following flash discharge tube is proposed (e.g. PTL 1).

In the flash discharge tube in PTL 1, the outer peripheral surface of the flash discharge tube is closely attached to a reflector (conductive reflector), and a trigger lead wire is connected to the reflector, so as to use the reflector as the external trigger electrode. This omits the use of the thin conductive film conventionally formed on the outer peripheral surface of the flash discharge tube. Accordingly, a disadvantage of absorbing the light emitted from the flash discharge tube is solved.

On the other hand, there is an increasing demand for a strobe device that can emit light with a small light quantity by making the flash discharge tube emit light for a short period. When the flash discharge tube emits light with a small light quantity, the discharge path needs to be further stabilized by suppressing movement of discharge path at every light emission, in order to suppress variation in light quantity and variation in light distribution of light emitted from the flash discharge tube.

However, the flash discharge tube in PTL 1 does not disclose the closely-attached state of the flash discharge tube and the conductive reflector. Therefore, when the flash discharge tube emits light with a small light quantity, unignorable variation in discharge path may occur, depending on the shape of conductive reflector. As a result, variation in light quantity and variation in light distribution of light emitted from the flash discharge tube cannot be sufficiently suppressed.

CITATION LIST

Patent Literature

PTL 1 Japanese Utility Model Unexamined Publication No. S62-142152

SUMMARY OF THE INVENTION

To solve the above disadvantage, a strobe device of the present invention includes a flash discharge tube having an anode electrode and a cathode electrode at both ends thereof, and a conductive reflector in contact with an outer peripheral surface of the flash discharge tube. The reflector houses a part of the flash discharge tube inside, and functions as an external trigger electrode. The reflector has a bottom that is in contact with the portion of the outer peripheral surface of the flash discharge tube, the portion covering at least an area between the anode electrode and the cathode electrode and the outer peripheral surface covering a sintered metal of the cathode electrode.

This can suppress variation in discharge path at every light emission from the flash discharge tube. As a result, variation in light quantity and variation in light distribution of light emitted from the strobe device can be suppressed.

DESCRIPTION OF EMBODIMENTS

An exemplary embodiment of a strobe device of the present invention is described with reference to drawings. However, it is apparent that the present invention is not limited by the exemplary embodiment.

Exemplary Embodiment

The strobe device in the exemplary embodiment of the present invention is described below with reference to FIGS. 1A to 2.

Figure 1A:
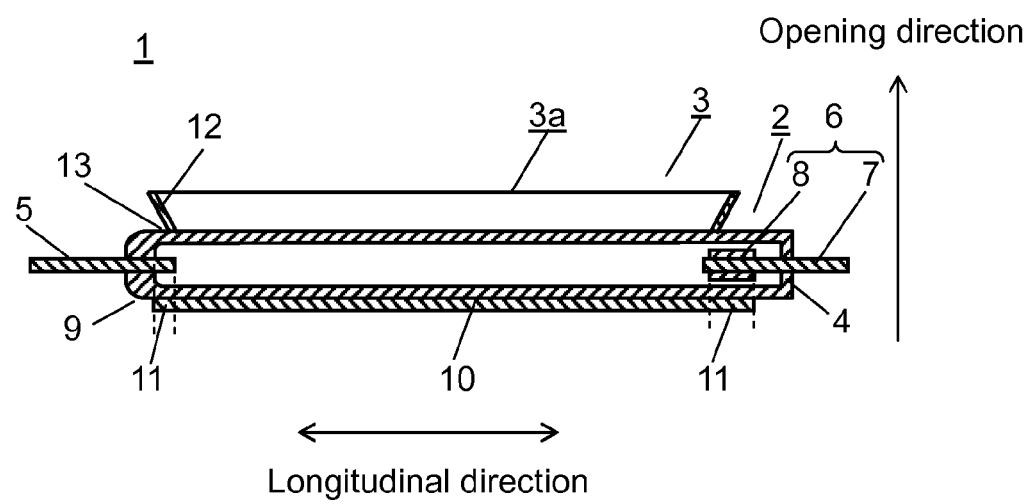
FIG. 1A is a sectional view of a strobe device in accordance with an exemplary embodiment of the present invention.
Figure 1B:
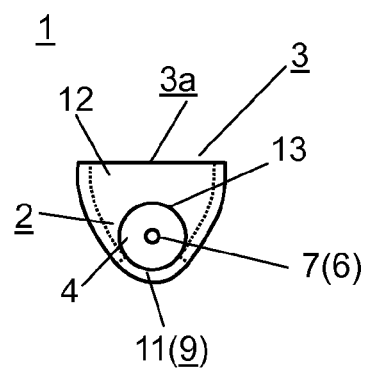
FIG. 1B is a side view of the strobe device in the exemplary embodiment.

FIG. 1A is a sectional view of the strobe device in the exemplary embodiment of the present invention. FIG. 1B is a side view of the strobe device in the exemplary embodiment. FIG. 2 is a development view of a reflector in the exemplary embodiment.

As shown in FIGS. 1A and 1B, strobe device 1 in the exemplary embodiment at least includes flash discharge tube 2 for emitting light and conductive reflector 3 with opening 3a. Strobe device 1 is configured such that an outer peripheral surface of flash discharge tube 2 in a longitudinal direction is in contact with a part of reflector 3. Strobe device 1 illuminates a photographic subject (not illustrated) by distributing light emitted from flash discharge tube 2 toward opening 3a of the reflector. A thin conductive film may be provided on the outer peripheral surface of glass bulb 4 at least covering between anode electrode 5 and cathode electrode 6, and reflector 3 may be in contact with the outer peripheral surface of glass bulb 4 via the thin conductive film.

Flash discharge tube 2 includes glass bulb 4 formed of a tubular hard glass, such as borosilicate glass, anode electrode 5, and cathode electrode 6. Anode electrode 5 and cathode electrode 6 are bar electrodes provided at both ends of glass bulb, respectively. Noble gas, such as xenon, is filled in glass bulb 4 at a predetermined pressure.

Flash discharge tube 2 produces light such that electrons discharged by voltage applied between anode electrode 5 and cathode electrode 6 from an external circuit (not illustrated) collide with and excite the noble gas filled in glass bulb 4. This emits the light from flash discharge tube 2 outward to illuminate the subject.

As shown in FIG. 1A, anode electrode 5 is provided at one end of glass bulb 4 in the longitudinal direction via a glass bead (not illustrated), and inserted to glass bulb 4 and fixed. In other words, anode electrode 5 is welded to one end of glass bulb 4 via the glass bead, and it is fixed in the state inserted to glass bulb 4 at this one end.

More specifically, anode electrode 5 is, although not illustrated, configured typically by butt welding of an end of tungsten bar and an end of nickel bar. Here, the nickel bar is disposed outside glass bulb 4, and the tungsten bar is inserted into the glass bead and disposed inside glass bulb 4.

On the other hand, as shown in FIG. 1A, cathode electrode 6 is provided at the other end of glass bulb 4 in the longitudinal direction via a glass bead (not illustrated), and inserted to glass bulb 4 and fixed. In other words, cathode electrode 6 is welded to the other end of glass bulb 4 via the glass bead, and it is fixed in the state inserted to glass bulb 4 at this the other end.

More specifically, cathode electrode 6 includes bar electrode 7 and sintered metal 8 attached to the tip side of bar electrode 7. Bar electrode 7 is configured typically by butt welding of an end of tungsten bar and an end of nickel bar. Here, in the same way as the anode electrode, the nickel bar is disposed outside glass bulb 4, and the tungsten bar is inserted into the glass bead and disposed inside glass bulb 4.

Sintered metal 8 of cathode electrode 6 is formed typically of a mixture of fine metal powder of tungsten and tantalum or a mixture of fine metal powder of tantalum and nickel. After attaching sintered metal 8 to an end of the tungsten bar of bar electrode 7 inside glass bulb 4, typically by caulking, this is heated at around 600° C. to sinter and integrate with bar electrode 7.

Figure 2:
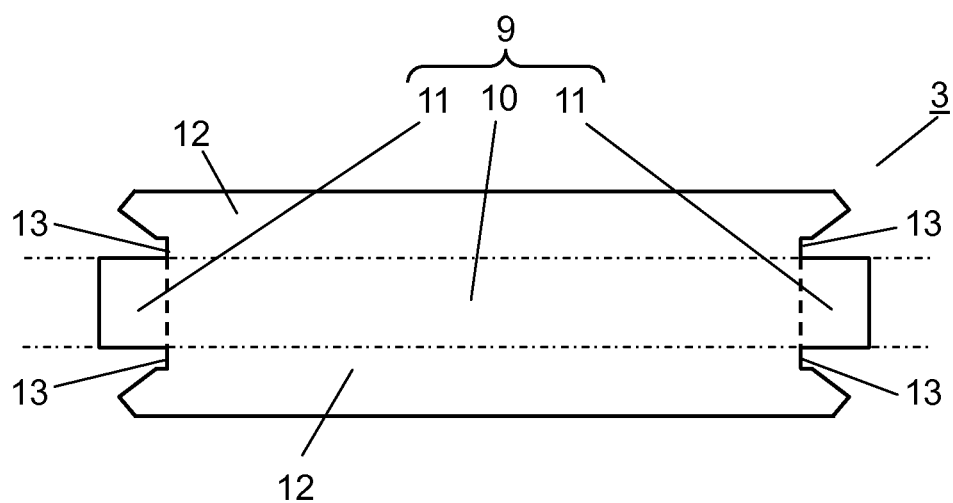
FIG. 2 is a development view of a reflector in the exemplary embodiment.

Reflector 3, as shown in FIG. 2, includes bottom 9 that is in contact with at least a part of the outer peripheral surface of flash discharge tube 2, side reflective parts 12 that reflect light emitted from flash discharge tube 2 toward the opening, and attachment hole 13 for inserting and housing flash discharge tube 2 inside side reflective parts 12. A cross-section surface of reflector 3 in a direction of opening 3a shown in FIGS. 1A and 1B (a cross-section surface seen from the direction in FIG. 1B) is concave, and light emitted from flash discharge tube 2 is reflected toward opening 3a of reflector 3 to illuminate the subject. Reflector 3 is configured with a conductive material, such as aluminum, and mirror-like finishing is applied, for example, to a surface inside the concave shape of reflector 3. This enables to efficiently reflect light emitted from flash discharge tube 2 housed inside reflector 3 toward opening 3a to illuminate the subject.

Bottom 9 forming an inner face of the concave shape of reflector 3 includes base 10 in contact with the outer peripheral surface of flash discharge tube 2 such that base 10 covers at least an area between anode electrode 5 and cathode electrode 6, and extended parts 11 extending from base 10 in the longitudinal direction of flash discharge tube 2. As shown in FIG. 1A, by providing extended parts 11 extending from base 10 of reflector 3, reflector 3 is in contact with at least a partial area in the radial direction of the outer peripheral surface of flash discharge tube 2 in such a way that sintered metal 8 of cathode electrode 6 to the entire or almost entire area of anode electrode 5 inside glass bulb 4 are covered. Accordingly, reflector 3 functions as an external trigger electrode for flash discharge tube 2.

Bottom 9 of reflector 3 alone functions as the external trigger electrode by being in contact with the partial area of the outer peripheral surface of flash discharge tube 2. However, when a thin conductive film is formed on the outer peripheral surface of glass bulb 4, bottom 9 of reflector 3 and the thin conductive film function as the external trigger electrode for flash discharge tube 2.

As shown in FIGS. 1A and 1B, base 10 of reflector 3 is formed in an arc shape to be in plane contact with at least the partial area in the radial direction of the outer peripheral surface of glass bulb in such a way that base 10 covers an area between anode electrode 5 and cathode electrode 6. Here, the inner peripheral face of base 10 of reflector 3 is formed in the arc shape having a radius same as a radius of at least the partial area in the radial direction of the outer peripheral surface of glass bulb 4 so that base 10 is in plane contact with at least the partial area in the radial direction of the outer peripheral surface of glass bulb 4. Base 10 of reflector 3 functions as a reflective plate for reflecting light emitted from flash discharge tube 2, and also functions as the external trigger electrode for flash discharge tube 2.

In addition, as shown in FIG. 2, extended part 11 of reflector 3 is formed in an arc shape that has a radius same as that of base 10. Extended part 11 extends from an end of base 10 of reflector 3 in the longitudinal direction of glass bulb 4. Since the inner peripheral surface of extended part 11 of reflector 3 has the radius same as that of base 10 of reflector 3 and is provided extending from base 10, extended part 11 is in plane contact with at least a partial area of the outer peripheral surface of glass bulb 4, same as the inner peripheral surface of base 10 of reflector 3. Extended part 11 of reflector 3 extend from both ends of base 10 of reflector 3 to at least a partial area in the radial direction of the outer peripheral surface of glass bulb 4 in such a way that extended part 11 covers the entire or almost entire anode electrode 5 inside glass bulb 4 and sintered metal 8 of cathode electrode 6. Accordingly, the inner peripheral face of extended part 11 of reflector 3 also is in plane contact with at least the partial area in the radial direction of the outer peripheral surface of glass bulb 4. As a result, extended part 11 of reflector 3 also functions as the external trigger electrode of flash discharge tube 2, same as base 10 of reflector 3.

Side reflective part 12 in the longitudinal direction of reflector 3 is formed typically in a long tubular shape, and configures a side wall of reflector 3 that has a concave cross-sectional shape toward opening 3a. On the other hand, as shown in the sectional view in FIG. 1A, side reflective part 12 in the direction of opening 3a of reflector 3 is formed to open its rectangular opening toward opening 3a from base 10 of reflector 3. Here, the inner face of the side wall of side reflective part 12 of reflector 3 is designed in a predetermined curve, such as approximate parabola (including parabola), as shown in FIG. 1B, so as to prevent reflection of light emitted from flash discharge tube 2 in a direction out of an illumination range.

Attachment hole 13 of reflector 3, as shown in FIG. 2, is provided next to base 10 of reflector 3 such that both end faces of tubular side reflective part 12 of reflector 3 become partly open. Attachment hole 13 of reflector 3 is provided at a position to set the axial direction of tubular flash discharge tube 2 to a direction vertical to opening 3a. Attachment hole 13 of reflector 3 has a radius same as that of flash discharge tube 2, and thus it is in close contact with the partial area in the radial direction of the outer peripheral surface of flash discharge tube 2. This enables a part of the outer peripheral surface of flash discharge tube 2 inserted into attachment hole 13 of reflector 3 to make contact with bottom 9 of reflector 3. A bushing (not illustrated) may be provided between attachment hole 13 of reflector 3 and inserted to flash discharge tube 2, and the outer peripheral surface of flash discharge tube 2 may be in contact with bottom 9 of reflector 3.

Strobe device 1 in this exemplary embodiment is configured as described above.

Next is described an action and effect of strobe device 1 in the exemplary embodiment of the present invention.

Flash discharge tube 2 of strobe device 1 in the exemplary embodiment employs glass bulb 4 with outer diameter of 1.50 mm. As shown in FIG. 1B, bottom 9 of reflector 3 is configured to be in plane contact with the partial area of the outer peripheral surface of glass bulb 4 in a range of, for example, about 100° in a circumferential direction (radial direction) of glass bulb 4. In this structure, a width of bottom 9 in plane contact with glass bulb 4 is about 1.31 mm.

The case of emitting a small light quantity, using flash discharge tube 2 as configured above, is described below.

First, a trigger pulse for generating a required light quantity is applied from, for example, an external circuit (not illustrated) to bottom 9 of reflector 3. Here, the noble gas filled in glass bulb 4 is activated and ionized near the outer peripheral surface of glass bulb 4 that is in contact with bottom 9 of reflector 3 by the trigger pulse applied to bottom 9 of reflector 3. More specifically, by applying the trigger pulse, the noble gas filled in glass bulb 4 is activated and ionized near the inner periphery of glass bulb in contact with base 10 and extended part 11 configuring bottom 9 of reflector 3. If the thin conductive film is provided on the outer peripheral surface of glass bulb 4, the trigger pulse is also applied to the thin conductive film via bottom 9 of reflector 3. As a result, the noble gas near the inner periphery of glass bulb 4 between anode electrode 5 and cathode electrode 6 is also activated and ionized by applying the trigger pulse also to the thin conductive film.

When voltage is applied between anode electrode 5 and cathode electrode 6 of flash discharge tube 2, a flow of electrons is produced inside glass bulb 4. By collision of electrons travelling inside glass bulb 4 with the noble gas, the noble gas is excited and light is produced. The light produced is emitted outward from glass bulb 4 of flash discharge tube 2. The light emitted outward is reflected by reflector 3 of flash discharge tube 2 toward opening 3a shown in FIG. 1A to illuminate the subject.

When the trigger pulse is applied to extended part 11 of reflector 3, the noble gas sealed in glass bulb 4 is activated, for example, near the outer periphery of the cathode electrode of flash discharge tube 2 in contact with extended part 11. At this point, electrons become more likely discharged near the cathode electrode than at other part, and thus light emission become easier. Applied voltage for light emission of flash discharge tube 2 can thus be decreased. In other words, electrons discharged from cathode electrode 6 tend to form a discharge path from near cathode electrode 6. This enables to reliably form the discharge path from near cathode electrode 6. Variation in formation position of discharge path is thus preventable by stabilizing the position of discharge path formed at every light emission. As a result, variation in light quantity and variation in light distribution of light emitted from the flash discharge tube of the strobe device can be suppressed.

As described above, strobe device 1 in the exemplary embodiment can prevent variation in discharge path even when the light is emitted with a small quantity. Variation in light quantity and variation in light distribution can thus be suppressed.

Still more, in strobe device 1 in the exemplary embodiment, the reflector can be downsized without extending the width of the reflector itself in the longitudinal direction by providing the extended part on the bottom of the reflector at the position of the cathode electrode of the flash discharge tube. As a result, the reflector can be downsized while retaining the opening size in the light emitting direction of the reflector used in the conventional strobe device. At the same time, variation in light quantity and variation in light distribution can be suppressed.

Still more, in strobe device 1 in the exemplary embodiment, the extended part of the reflector is in contact with the outer peripheral surface of the flash discharge tube protruding from the reflector, so as to facilitate connection with a trigger coil, for example, of the external circuit for generating the trigger pulse. This eliminates convex parts conventionally needed at a few points on the bottom of the reflector for preventing connection failure, such as lifting of the flash discharge tube and the reflector. As a result, manufacturing costs of the strobe device can be reduced.

The present invention is not limited to the above exemplary embodiment. It is apparent that all modifications falling the true spirit and scope of the present invention are feasible.

More specifically, the exemplary embodiment refers to an example of housing a part of glass bulb 4 inside reflector 3. However, the present invention is not limited to this structure. For example, entire glass bulb 4 may be housed inside reflector 3. Or, glass bulb 4 may be housed inside the reflector from the end of cathode electrode 6 of glass bulb 4b to glass bulb 4 in such a way that an area between anode electrode 5 and cathode electrode 6 is covered. This can achieve strobe device 1 that can more effectively emit light from flash discharge tube 2 toward the opening.

Still more, the exemplary embodiment refers to an example that bottom 9 (extended part 11 and base 10) of reflector 3 is in contact with the outer peripheral surface of glass bulb 4 in a range of 100° from the axial center. However, the present invention is not limited to this structure. Bottom 9 may be in contact with the outer peripheral surface of glass bulb 4 in a range of 120° or below from the axial center. In this case, bottom 9 (extended part 11 and base 10) of reflector 3 is in contact with the outer peripheral surface of glass bulb 4 in a range at sharp angles from the axial center, and thus flash discharge tube 2 becomes difficult to be lighted. However, since a discharge path inside glass bulb 4 becomes stabilized, variation in light quantity and variation in light distribution can be suppressed.

Still more, the exemplary embodiment refers to an example that entire bottom 9 (extended part 11 and base 10) of reflector 3 is in contact with glass bulb 4 along the outer peripheral surface in the longitudinal direction of glass bulb 4. However, the present invention is not limited to this structure. For example, bottom 9 (extended part 11 and base 10) of reflector 3 is a flat sheet or curved on the outer peripheral surface in the longitudinal direction of glass bulb 4, and a part of reflector 3 may be in contact with the outer peripheral surface of glass bulb 4. This can simplify or omit a process of making entire bottom 9 (extended part 11 and base 10) of reflector 3 contact glass bulb 4. As a result, manufacturing costs of strobe device 1 can be reduced.

Furthermore, the exemplary embodiment refers to an example of providing extended part 11 of reflector 3 up to a position facing anode electrode 5 and cathode electrode 6. However, the present invention is not limited to this structure. For example, extended part 11 of reflector 3 may be provided only on the side of cathode electrode 6. This eliminates the need of providing extended part 11 facing anode electrode 5, and thus manufacturing costs of strobe device 1 can be reduced.

Next is described variation in light-emission amount of the strobe device of the present invention, using specific Examples and comparing with Comparisons, with reference to FIGS. 3A to 4B. It is apparent that the present invention is not limited to the following examples. As long as the intention of the present invention is retained, materials to be used may be changed.

Figure 3A:
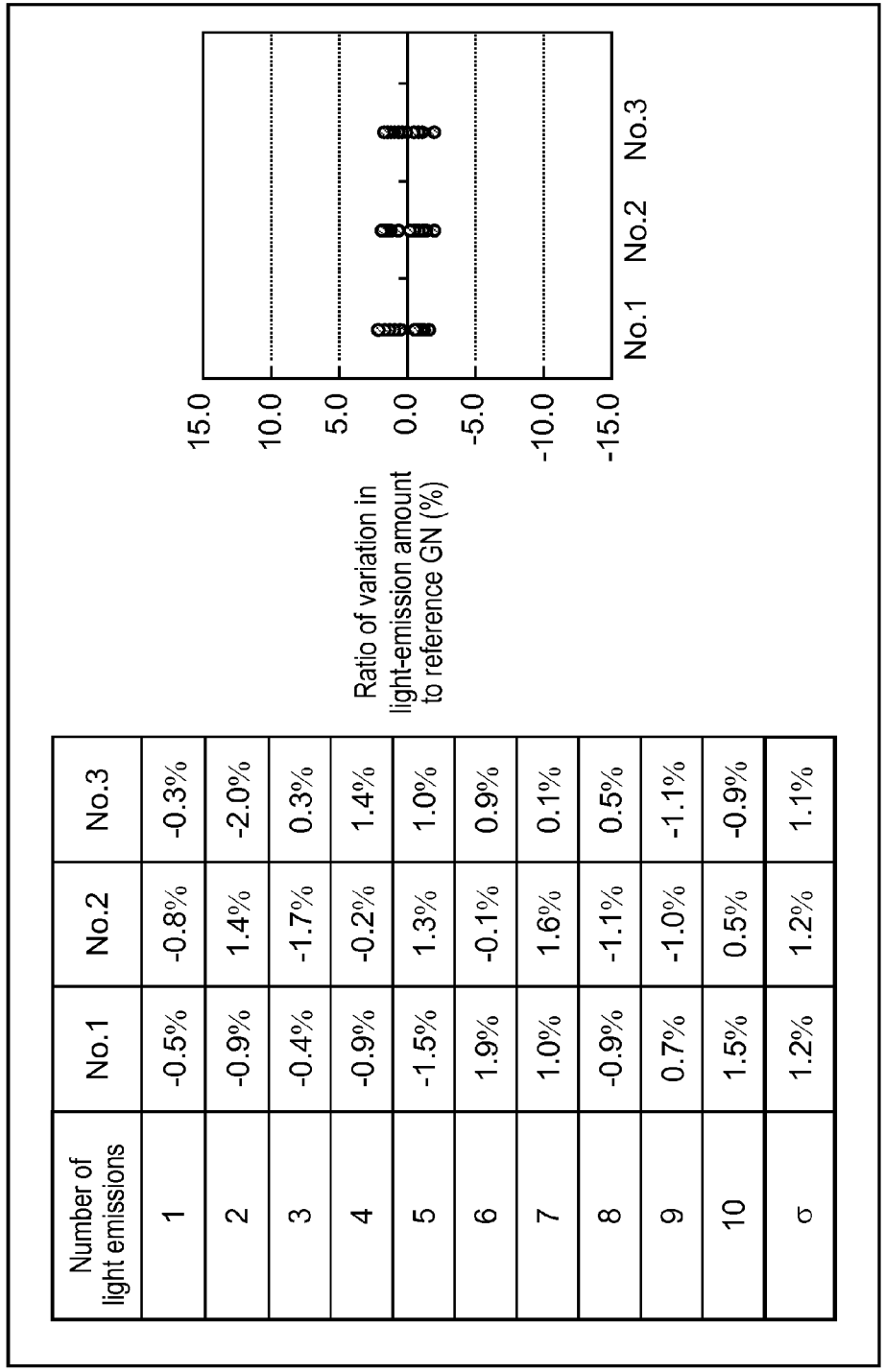
FIG. 3A illustrates variation in light-emission amount when a thin conductive film is not used in the strobe device in the exemplary embodiment of the present invention.
Figure 3B:
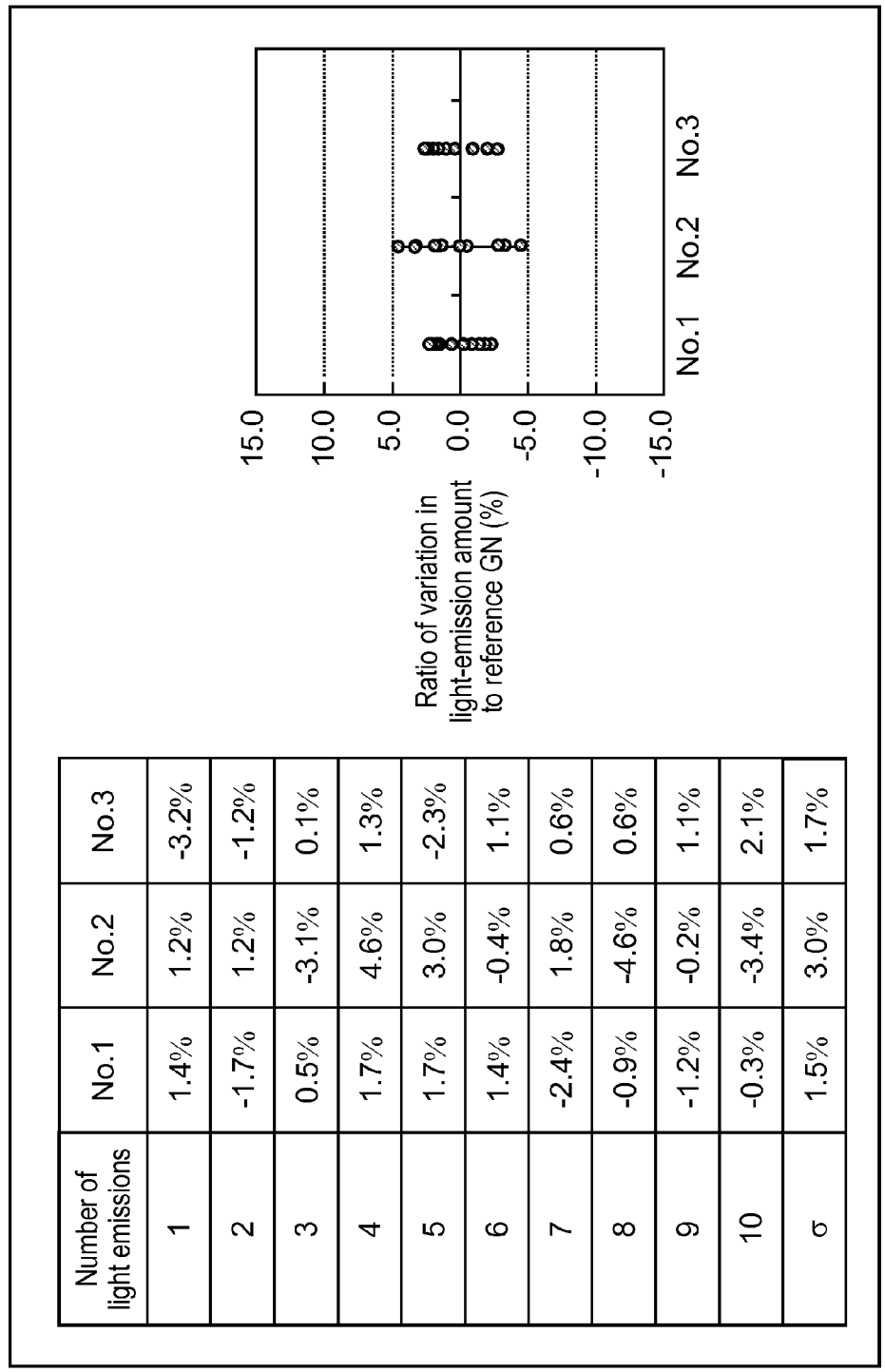
FIG. 3B illustrates variation in light-emission amount when the thin conductive film is not used in a conventional strobe device.
Figure 4A:
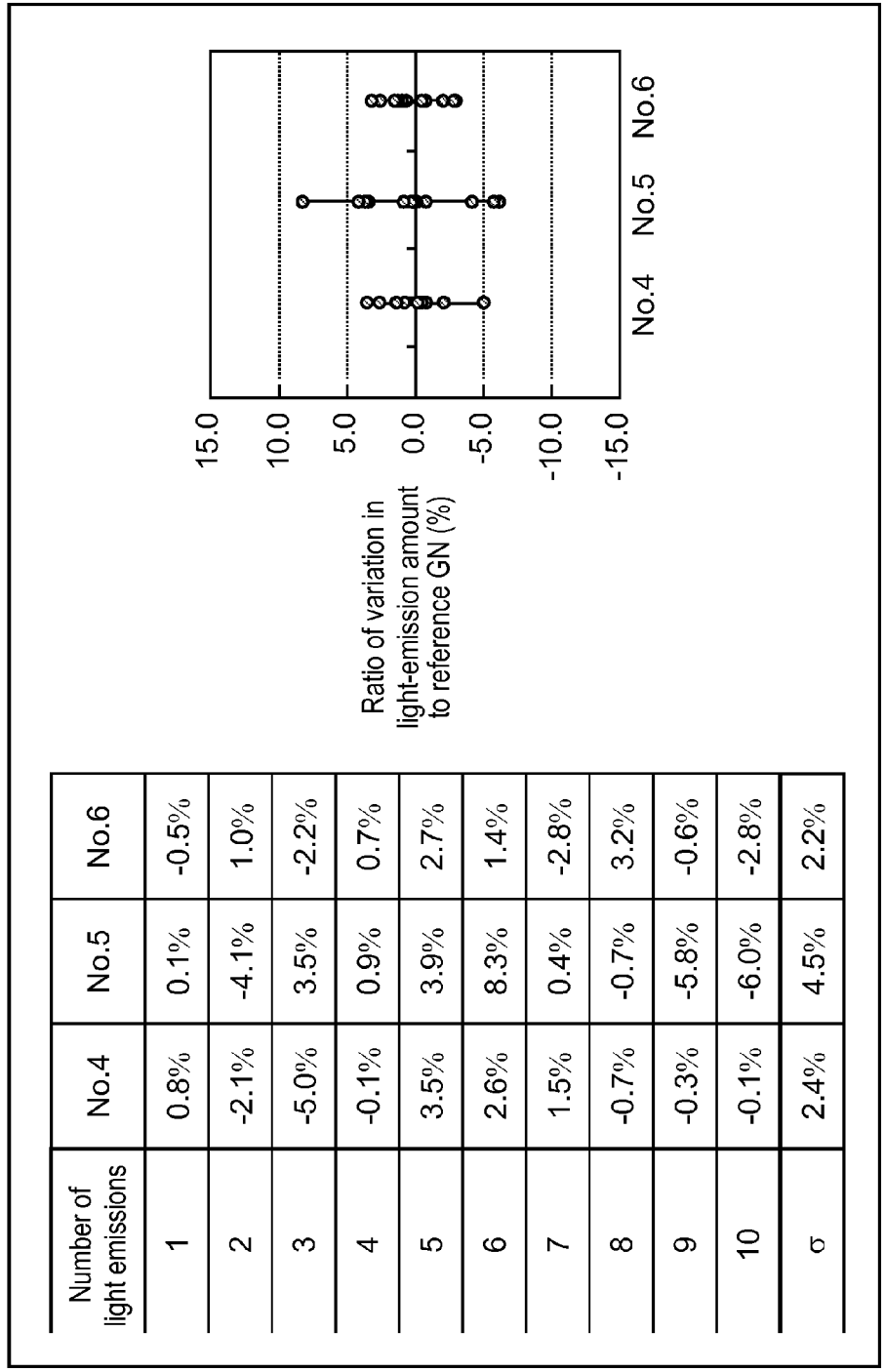
FIG. 4A illustrates variation in light-emission amount when the thin conductive film is used in the strobe device in the exemplary embodiment of the present invention.
Figure 4B:
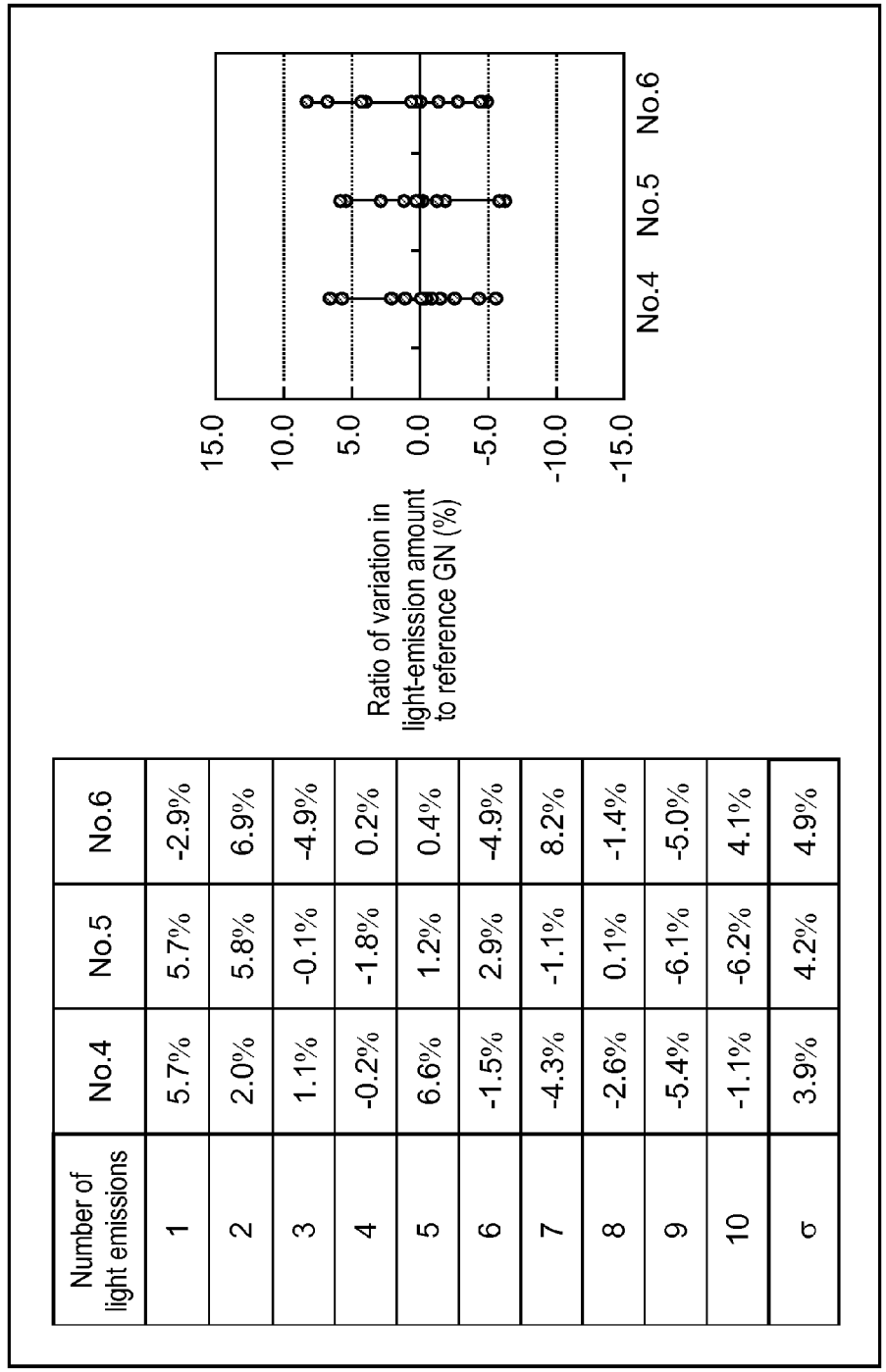
FIG. 4B illustrates variation in light-emission amount when the thin conductive film is used in the conventional strobe device.

FIG. 3A illustrates variation in light-emission amount when the thin conductive film is not used in the strobe device in the exemplary embodiment of the present invention. FIG. 3B illustrates variation in light-emission amount when the thin conductive film is not used in the conventional strobe device. FIG. 4A illustrates variation in light-emission amount when the thin conductive film is used in the strobe device in the exemplary embodiment of the present invention. FIG. 4B illustrates variation in light-emission amount when the thin conductive film is used in the conventional strobe device.

In other words, FIG. 3A shows variation in light-emission amount of strobe devices in which the thin conductive film is not formed on the outer peripheral surface of the glass bulb, but extended part 11 is provided on the reflector, as Example 1 to Example 3. On the other hand, FIG. 3B shows variation in light-emission amount of strobe devices in which the thin conductive film is not formed on the outer peripheral surface of the glass bulb, and extended part 11 is not provided on the reflector, as Comparison 1 to Comparison 3.

FIG. 4A shows variation in light-emission amount of strobe devices in which the thin conductive film is formed on the outer peripheral surface of the glass bulb, and extended part 11 is provided on the reflector, as Example 4 to Example 6. On the other hand, FIG. 4B shows variation in light-emission amount of strobe devices in which the thin conductive film is formed on the outer peripheral surface of the glass bulb, but extended part 11 is not provided on the reflector, as Comparison 4 to Comparison 6.

Example 1

As Example 1, strobe device (No. 1) is prepared without forming the thin conductive film on the outer peripheral surface of the glass bulb of the flash discharge tube, but providing extended part 11 on the reflector.

Next, a trigger pulse is applied to bottom 9 of the reflector of the prepared strobe device for 5 μsec to emit light from the strobe device, and its light quantity is measured typically using a light quantity measuring device. Then, a ratio of light-emission amount of the strobe device of Example 1 to GN (guide number) indicating expected light quantity of the strobe device is calculated.

Next, in the above state, the trigger pulse is applied sequentially for ten times to the strobe device of Example 1 to make the strobe device emit light ten times. The light-emission amount is measured each time.

Then, a ratio of measured light quantity in each of ten light emissions to above GN is calculated, so as to evaluate variation in light-emission amount.

As a result, as shown in strobe device (No. 1) in FIG. 3A, light-emission amount varies from 0.4% at minimum to 1.9% at maximum in absolute values relative to reference GN.

Standard deviation σ of strobe device (No. 1) in ten light emissions is 1.2%.

Example 2

As Example 2, strobe device (No. 2) different from Example 1 is prepared without forming the thin conductive film on the outer peripheral surface of the glass bulb of the flash discharge tube, but providing extended part 11 on the reflector, in the same way as Example 1.

Then, variation in light-emission amount is evaluated under measuring conditions same as Example 1.

As a result, as shown in strobe device (No. 2) in FIG. 3A, light-emission amount varies from 0.1% at minimum to 1.7% at maximum in absolute values relative to reference GN.

Standard deviation σ of strobe device (No. 2) in ten light emissions is 1.2%.

Example 3

As Example 3, strobe device (No. 3) different from Example 1 is prepared without forming the thin conductive film on the outer peripheral surface of the glass bulb of the flash discharge tube, but providing extended part 11 on the reflector, in the same way as Example 1.

Then, variation in light-emission amount is evaluated under measuring conditions same as Example 1.

As a result, as shown in strobe device (No. 3) in FIG. 3A, light-emission amount varies from 0.1% at minimum to 2.0% at maximum in absolute values relative to reference GN.

Standard deviation σ of strobe device (No. 3) in ten light emissions is 1.1%.

(Comparison 1)

As Comparison 1, conventional strobe device (No. 1) is prepared without forming the thin conductive film on the outer peripheral surface of the glass bulb of the flash discharge tube and without providing extended part 11 on the reflector.

Then, variation in light-emission amount is evaluated under measuring conditions same as Example 1.

As a result, as shown in strobe device (No. 1) in FIG. 3B, light-emission amount varies from 0.3% at minimum to 2.4% at maximum in absolute values relative to reference GN.

Standard deviation σ of conventional strobe device (No. 1) in ten light emissions is 1.5%.

(Comparison 2)

As Comparison 2, same as Comparison 1, conventional strobe device (No. 2) is prepared without forming the thin conductive film on the outer peripheral surface of the glass bulb of the flash discharge tube and without providing extended part 11 on the reflector.

Then, variation in light-emission amount is evaluated under measuring conditions same as Example 1 and Comparison 1.

As a result, as shown in conventional strobe device (No. 2) in FIG. 3B, light-emission amount varies from 0.2% at minimum to 4.6% at maximum in absolute values relative to reference GN.

Standard deviation a of conventional strobe device (No. 2) in ten light emissions is 3.0%.

(Comparison 3)

As Comparison 3, same as Comparison 1, conventional strobe device (No. 3) is prepared without forming the thin conductive film on the outer peripheral surface of the glass bulb of the flash discharge tube and without providing extended part 11 on the reflector.

Then, variation in light-emission amount is evaluated under measuring conditions same as Example 1 and Comparison 1.

As a result, as shown in conventional strobe device (No. 3) in FIG. 3B, light-emission amount varies from 0.1% at minimum to 3.2% at maximum in absolute values relative to reference GN.

Standard deviation a of conventional strobe device (No. 3) in ten light emissions is 1.7%.

As described above, results of Example 1 to Example 3 shown in FIG. 3A and results of Comparison 1 to Comparison 3 shown in FIG. 3B reveal that the strobe device of the present invention suppresses variation in light-emission amount and reduces the standard deviation, compared to that of the conventional strobe device.

In addition, since variation in light-emission amount of the strobe device can be suppressed by emitting light from a stable position inside flash discharge tube 2, it is apparent that variation in discharge path is accordingly suppressed. As a result, the structure of the strobe device of the present invention can also suppress distribution of light emitted from the strobe device.

On the other hand, the thin conductive film is not formed on the outer peripheral surface of the glass bulb in each strobe device from Example 1 to Comparison 3. In general, lighting of flash discharge tube 2 becomes easier by providing the thin conductive film. However, the thin conductive film causes unstable discharge path inside glass bulb 4, and blocks the light emitted from flash discharge tube 2. Quantity of light emitted from the strobe device thus reduces. Accordingly, it is generally preferable not to provide the thin conductive film on the outer peripheral surface of the glass bulb, but an effect when the thin conductive film is provided is also evaluated in the same way below.

Variation in light-emission amount when the thin conductive film is provided in the strobe device of the present invention is evaluated below, using specific examples. Results are described below with reference to FIGS. 4A and 4B, comparing with Comparisons.

FIG. 4A shows variation in light-emission amount of strobe devices in which the thin conductive film is formed on the outer peripheral surface of the glass bulb, and extended part 11 is provided on the reflector, as Example 4 to Example 6. On the other hand, FIG. 4B shows variation in light-emission amount of strobe devices in which the thin conductive film is formed on the outer peripheral surface of the glass bulb, but extended part 11 is not provided on the reflector, as Comparison 4 to Comparison 6.

Example 4

As Example 4, strobe device (No. 4) is prepared by forming the thin conductive film typically made of tin on the outer peripheral surface of the glass bulb of the flash discharge tube, and providing extended part 11 on the reflector.

Next, a trigger pulse is applied to bottom 9 of the reflector of the prepared strobe device for 15 μsec to emit light from the strobe device, and its light quantity is measured typically using a light quantity measuring device. Then, a ratio of light-emission amount of the strobe device of Example 4 to GN (guide number) indicating expected light quantity of the strobe device is calculated.

Next, in the above state, the trigger pulse is applied sequentially for ten times to the strobe device of Example 4 to make the strobe device emit light ten times. The light-emission amount is measured each time.

Then, a ratio of measured light quantity in each of ten light emissions to above GN is calculated, so as to evaluate variation in light-emission amount.

As a result, as shown in strobe device (No. 4) in FIG. 4A, light-emission amount varies from 0.1% at minimum to 5.0% at maximum in absolute values relative to reference GN.

Standard deviation a of strobe device (No. 4) in ten light emissions is 2.4%.

Example 5

As Example 5, strobe device (No. 5) different from Example 4 is prepared by forming the thin conductive film on the outer peripheral surface of the glass bulb of the flash discharge tube, and providing extended part 11 on the reflector, in the same way as Example 4.

Then, variation in light-emission amount is evaluated under measuring conditions same as Example 4.

As a result, as shown in strobe device (No. 5) in FIG. 4A, light-emission amount varies from 0.1% at minimum to 8.3% at maximum in absolute values relative to reference GN.

Standard deviation a of strobe device (No. 5) in ten light emissions is 4.5%.

Example 6

As Example 6, strobe device (No. 6) different from Example 4 is prepared by forming the thin conductive film on the outer peripheral surface of the glass bulb of the flash discharge tube, and providing extended part 11 on the reflector, in the same way as Example 4.

Then, variation in light-emission amount is evaluated under measuring conditions same as Example 4.

As a result, as shown in strobe device (No. 6) in FIG. 4A, light-emission amount varies from 0.5% at minimum to 3.2% at maximum in absolute values relative to reference GN.

Standard deviation a of strobe device (No. 6) in ten light emissions is 2.2%.

(Comparison 4)

As Comparison 4, conventional strobe device (No. 4) is prepared by forming the thin conductive film on the outer peripheral surface of the glass bulb of the flash discharge tube, and not providing extended part 11 on the reflector.

Then, variation in light-emission amount is evaluated under measuring conditions same as Example 4.

As a result, as shown in conventional strobe device (No. 4) in FIG. 4B, light-emission amount varies from 0.2% at minimum to 6.6% at maximum in absolute values relative to reference GN.

Standard deviation a of strobe device (No. 4) in ten light emissions is 3.9%.

(Comparison 5)

As Comparison 5, conventional strobe device (No. 5) is prepared by forming the thin conductive film on the outer peripheral surface of the glass bulb of the flash discharge tube, and not providing extended part 11 on the reflector.

Then, variation in light-emission amount is evaluated under measuring conditions same as Example 4 and Comparison 4.

As a result, as shown in conventional strobe device (No. 5) in FIG. 4B, light-emission amount varies from 0.1% at minimum to 6.2% at maximum in absolute values relative to reference GN.

Standard deviation a of strobe device (No. 6) in ten light emissions is 4.2%.

(Comparison 6)

As Comparison 6, conventional strobe device (No. 6) is prepared by forming the thin conductive film on the outer peripheral surface of the glass bulb of the flash discharge tube, and not providing extended part 11 on the reflector.

Then, variation in light-emission amount is evaluated under measuring conditions same as Example 4 and Comparison 4.

As a result, as shown in conventional strobe device (No. 6) in FIG. 4B, light-emission amount varies from 0.2% at minimum to 8.2% at maximum in absolute values relative to reference GN.

Standard deviation a of strobe device (No. 5) in ten light emissions is 4.9%.

As described above, results of Example 4 to Example 6 shown in FIG. 4A and results of Comparison 4 to Comparison 6 shown in FIG. 4B reveal that the strobe device of the present invention suppresses variation in light-emission amount and reduces standard deviation, even when the thin conductive film is provided on the outer peripheral surface of the glass bulb, compared to the conventional strobe device provided with the thin conductive film on the outer peripheral surface of the glass bulb. Standard deviation thus becomes smaller.

In addition, since variation in light-emission amount of the strobe device can be suppressed by emitting light from a stable position inside flash discharge tube 2, it is apparent that variation in discharge path are accordingly suppressed. As a result, the strobe device of the present invention can suppress variation in distribution of light emitted from the strobe device, even when the thin conductive film is formed.

Results of Example 1 to Example 3 shown in FIG. 3A and results of Example 4 to Example 6 shown in FIG. 4A reveal that the strobe device without thin conductive film can suppress variation in light-emission amount and reduce standard deviation more than strobe device 1 with thin conductive film. Since variation in light-emission amount of the strobe device can be suppressed by emitting light from a stable position inside flash display tube 2, it is apparent that variation in discharge path is accordingly suppressed. As a result, the strobe device of the present invention without thin conductive film can also further effectively suppress variation in distribution of light emitted from the strobe device.

As described using Examples and Comparisons, the strobe device of the present invention effectively suppresses variation in the light quantity and variation in light distribution by making bottom 9 of reflector 3 contact flash discharge tube 2 without providing the thin conductive film. Accordingly, a highly-reliable strobe device can be achieved.

As described above, the strobe device of the present invention includes the flash discharge tube having the anode electrode and the cathode electrode on both ends thereof, and the conductive reflector in contact with the outer peripheral surface of the flash discharge tube. The reflector houses a part of the flash discharge tube inside and functions as the external trigger electrode. The reflector has the bottom that is in contact with a portion of the outer peripheral surface of the flash discharge tube, the portion covering at least an area between the anode electrode and the cathode electrode and a sintered metal of the cathode electrode.

This structure makes the bottom of the reflector contact at least a part of the outer peripheral surface of the flash discharge tube. Accordingly, the bottom of the reflector acts as the external trigger electrode for emitting light from the flash discharge tube. In addition, the bottom of the reflector is in contact with the outer peripheral surface of the flash discharge tube such that the bottom covers the sintered metal of the cathode electrode. When the trigger voltage is applied to the reflector acting as the external trigger electrode, the noble gas filled in the flash discharge tube is excited near the sintered metal of the cathode electrode. This can reduce the emission voltage and also suppress variation in discharge path at every light emission from the flash discharge tube. As a result, variation in light quantity and variation in light distribution of light emitted from the strobe device can be suppressed.

Still more, the bottom of the reflector in the strobe device of the present invention includes the base in contact with the outer peripheral surface of the flash discharge tube such that the base covers an area between the anode electrode and the cathode electrode, and the extended part extending from the base in the longitudinal direction of the flash discharge tube. The extended part is in contact with the outer peripheral surface of the flash discharge tube at least covering the sintered metal of cathode electrode.

This structure enables to cover the sintered metal of the cathode electrode just by the extended part of the bottom of the reflector without extending the width of the reflector itself in the longitudinal direction to match the position of the cathode electrode of the flash discharge tube. This prevents enlarging of the dimensions and shape of the reflector, and can thus downsize the strobe device.

Furthermore, the bottom of the reflector in the strobe device of the present invention is curved along the outer peripheral surface of the flash discharge tube.

This structure can broaden the area of the bottom of the reflector in contact with the outer peripheral surface of the flash discharge tube. As a result, the flash discharge tube can be more easily lighted.

INDUSTRIAL APPLICABILITY

The present invention can suppress variation in light quantity and variation in light distribution of light emitted from the strobe device by suppressing variation in discharge path at every light emission. Accordingly, the present invention is effectively applicable to strobe devices used for photographic purposes.

REFERENCE MARKS IN THE DRAWINGS

1 Strobe device
2 Flash discharge tube
3 Reflector
3a Opening
4 Glass bulb
5 Anode electrode
6 Cathode electrode
7 Bar electrode
8 Sintered metal
9 Bottom
10 Base
11 Extended part
12 Side reflective part
13 Attachment hole

The invention claimed is:
1. A strobe device comprising:
a flash discharge tube having an anode electrode and a cathode electrode at both ends thereof; and a conductive reflector in contact with an outer peripheral surface of the flash discharge tube, the reflector housing a part of the flash discharge tube excluding an area of the cathode electrode and functioning as an external trigger electrode, wherein the reflector has
- a) a base that is in contact with the part of the outer peripheral surface of the flash discharge tube housed in the reflector, and
- b) an extended part that is extending from the base and that is:
  - in contact with the outer peripheral surface of the flash discharge tube covering a sintered metal of the cathode electrode outside the reflector,
  - directly below the sintered metal, and
  - having a width less than a width of the base wherein a length of the base is along the axis of the flash discharge tube.

2. The strobe device of claim 1, wherein the bottom of the reflector is curved along the outer peripheral surface of the flash discharge tube.

\* \* \* \* \*